Patented June 2, 1953

2,640,832

UNITED STATES PATENT OFFICE 2,640,832

N-(HALOMETHYL)-MALEIMIDE AND PROCESS FOR PREPARING THE SAME

Pliny O. Tawney, Passaic, N. J., assignor to United States Rubber Company, New York, N. Y., a corporation of New Jersey No Drawing. Application May 29, 1952,
Serial No. 290,827

3 Claims. (Cl. 260—326.5)

This invention relates to improvements in chemicals, specifically N - (halomethyl) maleimides, and to a method of making them from N-methylolmaleimide.

These new compounds are useful as intermediates in making a new class of amines and their hydrohalides. These amines have the structure

wherein X is N-maleimidomethyl

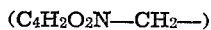

Y and Y' are X, hydrogen, alkyl, cycloalkyl, or aralkyl groups which can be alike or different. This class of amines is made by reacting either of the new compounds of my present invention with ammonia, a primary amine or a secondary amine in the proper proportions to form predominantly the desired amine. These amines and their quaternary ammonium salts are useful as detergents.

The following examples illustrate my invention. All parts are by weight.

Example 1

To a stirred suspension of 10 parts of N-methylolmaleimide (made as described by Tawney, U. S. Patent No. 2,526,517) in 40 parts of acetone at 3° C. there was added gradually 4.3 parts of phosphorus trichloride while the temperature of the solution was held at 3–5° C. The homogeneous solution thus formed was stirred for a short time after the addition was completed, and then the acetone was removed in vacuo. The crystalline residue was washed thoroughly with ice water, and dried in air to yield 9.2 parts, or 81% of theory, of the white compound N-(chloromethyl) maleimide melting at 78–79° C. Recrystallization from a mixture of benzene and Skellysolve B (a petroleum fraction which is largely n-hexane) did not change the melting point.

*Analysis.*—Calculated for $C_5H_4O_2NCl$, chlorine 24.4%. Found, chlorine 24.0, 24.3%.

This compound can also be made from N-methylolmaleimide and thionyl chloride by a similar procedure.

Example 2

N-(bromomethyl)maleimide was made by the procedure of Example 1 except that phosphorus tribromide (4.3 parts) was used instead of phosphorus trichloride. After removal of the acetone in vacuo the pale yellow crystalline residue was washed with Skellysolve B, dissolved in benzene and precipitated by adding Skellysolve B to the solution. The N-(bromomethyl) maleimide, 7.7 parts or 52% of theory, melted at 76–81° C. After being recrystallized twice from a mixture of benzene and Skellysolve B it was a white solid melting at 82.3–83.3° C. It decomposes more easily than N-(chloromethyl)maleimide in the presence of light and the moisture of the air. Consequently, it should be stored in the dark in a tightly closed container.

The use of acetone is not critical. Other organic liquids, e. g., ether, benzene and carbon tetrachloride, which are inert in this reaction, also can be used. Such liquids need not be solvents for N-methylolmaleimide. For example, when the reaction is carried out in benzene the N-methylolmaleimide is suspended in finely divided form in the solution of the phosphorus trihalide. As the reaction proceeds the suspension gradually disappears because the product being formed is soluble in benzene.

The temperature of the reaction is not critical. For example, it can be varied between 0° C. and the boiling point of phosphorus trichloride or thionyl chloride at atmospheric pressure.

The proportion of the reagents also is not critical. However, I prefer to use the halogenating agent in excess of theory; i. e., more than one-third mol per mol of N-methylolmaleimide, because it is somewhat difficult to separate N-(chloromethyl)-maleimide from unreacted N-methylol-maleimide. Any unreacted halogenating agent can be removed by distillation if desired, preferably in vacuo when N-(bromomethyl)-maleimide is being made. Alternately, the excess of the halogenating agent can be left in the solvent.

Having thus described my invention, what I claim and desire to protect by Letters Patent is:

1. A process which comprises reacting N-methylolmaleimide with a member of the group consisting of phosphorus trichloride, thionyl chloride, and phosphorus tribromide, and subsequently recovering a N-(halomethyl)maleimide.

2. A process which comprises reacting N-methylolmaleimide with phosphorus trichloride, and subsequently recovering N-(chloromethyl)-maleimide.

3. A process which comprises reacting N-methylolmaleimide with phosphrous tribromide, and subsequently recovering N-(bromomethyl)-maleimide.

PLINY O. TAWNEY.

No references cited.